UNITED STATES PATENT OFFICE.

HUGH RODMAN, OF EDGEWOOD, PENNSYLVANIA, ASSIGNOR TO RODMAN CHEMICAL COMPANY, A CORPORATION OF PENNSYLVANIA.

FOOD PRODUCT AND METHOD OF MAKING THE SAME.

1,270,875.　　　　Specification of Letters Patent.　　Patented July 2, 1918.

No Drawing.　　Application filed January 25, 1917.　Serial No. 144,365.

*To all whom it may concern:*

Be it known that I, HUGH RODMAN, a citizen of the United States, and a resident of Edgewood, in the county of Allegheny and State of Pennsylvania, have made a new and useful Invention in Food Products and Methods of Making the Same, of which the following is a specification.

This invention relates to food products and has for an object the production of a new process of treating flour and the production of a new food product.

An object of this invention is to produce a food product consisting of thin walled bubbles, in which the wall of each bubble consists of a cooked edible material which incloses the hollow interior of the bubble. The process employed in accomplishing this object consists in agitating a finely divided or powdered mass, such as flour, in heating the mass so as to maintain it at a determined temperature, in adding a liquid in a more or less subdivided state or in small globules to the heated and agitated mass. In this way I produce a food product which may be described as thin walled bubbles and which may be used directly as a cooked food, or which may serve as a base for further operation.

In carrying out the process I employ a liquid which will co-act or react with the floured mass in such a way as to form glutinous pellets, which may be termed dough pellets. Each drop or globule of liquid added to the agitated mass forms such a pellet and the heat of the mass or the heat of the material forming each pellet causes the liquid within the pellet to vaporize, thereby expanding the pellet or transforming it into a thin walled bubble. Inasmuch as the agitation of the mass will tend to collapse the pellets after they are formed, it is essential that the mass be heated to such a temperature that each pellet will not only be expanded to form a thin walled bubble, but will also be cooked or be subjected to sufficient heat to harden the wall of the bubble at or shortly after the formation of the bubble.

The best method I have developed for utilizing this process consists in tumbling dry flour in an inclined tumbling barrel, such as I have described in my copending application filed September 5, 1916, and serially numbered 118,472, in heating the tumbling mass as by external heat transmitted through the barrel, in dripping or spraying water into or upon the tumbling mass near the base of the barrel and finally allowing the finished product to flow over the lip of the barrel.

The action of the small masses of water falling into the heated, tumbling mass of flour seems to be to first coat themselves with the flour and then to expand and vaporize so as to form small bubbles of dough. These may be spherical or vermiform depending upon temperature, character of flour, rate of tumbling, size of water particle, etc., but in general they may be characterized as complete, thin-walled surfaces inclosing a space. The size of the bubble, the thinness of the wall, and the thoroughness of cooking can all be varied by varying the factors entering into the process. I have produced excellent results by tumbling at about thirty revolutions per minute in a tumbling barrel about 24″ in diameter, maintaining the mass at about 260 degrees Fahrenheit, and allowing the water to fall as ordinary drops onto the tumbling mass.

It is evident that the exact method of agitating the flour, the apparatus for supplying the water, the temperature of the flour, the temperature of the water, etc., can be varied without departing from the spirit and scope of the invention as set forth in the appended claims. I should also say that the term flour is used in a generic sense to denote ground or powdered dry food product, generally grains of wheat, etc., which are amenable to the treatment described, and I may use various mixtures of such products and may add flavors, salt, etc., as desired; I may also add soluble materials, such as sugar to the water, in which case the flour must be maintained above the vaporizing point of the solution.

The advantages of this treatment of flour consist in the easy and cheap production of clean and appetizing food products which can be manufactured and handled with a minimum production of waste and dust, and in the production from mixed flours of a uniform product in appetizing and novel form.

What I claim is:

1. The method of treating finely ground or powdered material which consists in agitating it in a dry state, in adding small particles of liquid to the agitated mass, and in maintaining the temperature of the mass above the vaporizing temperature of the liquid while adding the liquid.

2. The method of making a food product, which consists in agitating finely divided or ground edible material, in adding small globules of liquid to the agitated mass and in maintaining the agitated mass above the vaporizing temperature of the liquid added, while adding the liquid.

3. The method of making a food product, which consists in agitating a mass of flour in a heated state, in adding liquid in a sub-divided state to the agitated mass to form pellets, and in maintaining the agitated mass at a temperature sufficient to expand the pellets formed into thin-walled bubbles and to harden the thin walls of the bubbles.

4. The method of treating finely ground or powdered edible material, which consists in heating it above the vaporizing temperature of a liquid and then adding the liquid in a subdivided state.

5. The method of treating flour, which consists in heating it above the boiling point of water, agitating it, and adding small particles of water to the agitated mass.

6. The method of treating flour, which consists in heating it above the boiling point of water, tumbling the heated mass in a suitable device, and adding relatively small quantities of water to the tumbling heated mass.

7. The method of treating flour, which consists in heating it above the boiling temperature of water, tumbling the mass in an inclined tumbling barrel while so heated, and adding water in a sub-divided state to the heated tumbling mass.

8. The method of treating flour which consists in heating it above the vaporizing temperature of a liquid, tumbling the mass in an inclined tumbling barrel while so heated, adding small quantities of liquid to the surface of the heated tumbling mass, and continuously removing the products as formed.

9. A manufactured food product consisting of a complete shell of cooked edible material entirely surrounding a hollow space.

10. A food product consisting of separate thin-walled shells of cooked flour entirely surrounding a hollow space.

11. A manufactured food product consisting of a thin-walled complete shell of edible material entirely surrounding a hollow space.

In testimony whereof, I have hereunto subscribed my name this 24th day of January, 1917.

HUGH RODMAN.

Witnesses:
E. W. McCALLISTER,
ANNA CLOHERTY.